United States Patent
Tamura et al.

(10) Patent No.: US 6,284,885 B1
(45) Date of Patent: Sep. 4, 2001

(54) PROCESS FOR PREPARING (1→3)-β-D-GLUCAN FROM FUNGI

(75) Inventors: Hiroshi Tamura, Tokyo; Maki Aizawa, Saitama; Shigenori Tanaka, Tokyo, all of (JP)

(73) Assignee: Seikagaku Corporation, Tokyo (JP)

( * ) Notice: Subject to any disclaimer, the term of this patent is extended or adjusted under 35 U.S.C. 154(b) by 0 days.

(21) Appl. No.: 09/485,714

(22) PCT Filed: Aug. 31, 1998

(86) PCT No.: PCT/JP98/03882

§ 371 Date: Mar. 1, 2000

§ 102(e) Date: Mar. 1, 2000

(87) PCT Pub. No.: WO99/11671

PCT Pub. Date: Mar. 11, 1999

(30) Foreign Application Priority Data

Sep. 1, 1997 (JP) .................................. 9-236297

(51) Int. Cl.[7] ................................................. C07H 1/00
(52) U.S. Cl. ..................... 536/123.12; 536/124; 536/127
(58) Field of Search ............................. 536/123.12, 124, 536/127

(56) References Cited

U.S. PATENT DOCUMENTS 5,574,023   11/1996   Shibata et al. ....................... 514/54
5,641,643    6/1997   Tanaka et al. ....................... 435/23

FOREIGN PATENT DOCUMENTS

93/12243   6/1993   (WO).

OTHER PUBLICATIONS

Miura et al. *Chem. Pharm. Bull.* Nov. 1996, 44(11), 2137–2141.
Yoshioka et al. *Carbohydrate Research* 1985, 140, 93–100. (month not available).
Oliva et al. *Experimental Mycology* Jun. 1986, 10(2), 150–156.

*Primary Examiner*—Ralph Gitomer
*Assistant Examiner*—D. Khare
(74) *Attorney, Agent, or Firm*—Oblon, Spivak, McClelland, Maier & Neustadt, P.C.

(57) ABSTRACT

The present invention relates to a process for preparing (1→3)-β-D-glucan, comprising subjecting a fungal cell to oxidation degradation under alkaline conditions to release (1→3)-β-D-glucan from a cell wall of the cell. (1→3)-β-D-Glucan can be prepared easily and efficiently from a cell of a microorganism belonging to the genus Candida. An accurate measurement process having a high reproducibility of (1→3)-β-D-glucan can be provided by using the above-described glucan or stabilized glucan into a kit and using it as a standard substance, and a large amount of the (1→3)-β-D-glucan having various biological activities can be solubilized and purified from a fungus, such as Candida or the like.

11 Claims, 3 Drawing Sheets

PROCESS FOR PREPARING (1→3)-β-D-GLUCAN FROM FUNGI

TECHNICAL FIELD

The present invention relates to a process for preparing (1→3)-β-D-glucan from a fungal cell efficiently by an easy process, (1→3)-β-D-glucan prepared by the process, and use thereof. Particularly, the present invention relates to a novel process for easily and efficiently preparing (1→3)-β-D-glucan from a cell wall of a cell of a fungus belonging to the genus Candida, which activates a factor G activation system of a limulus amebocyte lysate and/or a prophenoloxidase cascade system of a body fluid of an arthropod, the thus obtained (1→3)-β-D-glucan, and use of the (1→3)-β-D-glucan for a (1→3)-β-D-glucan measurement.

BACKGROUND ART (1→3)-β-D-Glucan is a sugar chain which is broadly distributed in the natural world as a cell wall component of fungi, such as yeast, molds, mushrooms and the like, plants, and the like.

The glucan containing a (1→3)-β-D-glycoside bond is classified into (1) a straight chain glucan comprising only (1→3)-β-D-glycoside bond (curdlan, paramylon, or the like), (2) a glucan containing a (1→6)-β-D-glycoside bond and a (1→3)-β-D-glycoside bond, and (3) a glucan containing a (1→4)-β-D-glycoside bond and a (1→3)-β-D-glycoside bond (lichenans, barley albumen glucan, or the like) Furthermore, the glucan of (2) can be classified into small groups, such as (2-1) laminaran having a zigzag structure derived from brown algae of the genus Eisenia, (2-2) laminaran comprising a zigzag structure having a branch derived from brown algae of the genus Laminaria, (2-3) glucan having a multi-branched dendriform structure derived from a cell wall of most of fungi or algae, (2-4) sclerotan, schizophyllan, lentinan, and the like, having a short chain branched structure, and (2-5) glucan having a repeated branched chain structure derived from a cell wall of bakery's yeast and the genus Candida. Thus, various structures exist (Aketagawa, J., Tamura, H. and Tanaka, S., *J. Antibact. Antifung. Agents,* 23(7): 413–419 (1995)). In this specification, the glucan containing a (1→3)-β-D-glycoside bond is called "(1→3)-β-D-glucan" (hereinafter referred to as "BG"). The BG shows various biological activities, such as activation of a reticuloendothelial system including production induction of various cytokines from a macrophage and the like, activation of a complement system, antitumor activities (for example, lentinan prepared from *Lentinus edodes*, schizophyllan prepared from *Schizophyllum commune* and the like are on the market as medicaments showing antitumor activities), and the like.

Also, since this substance group is cited as one of the causal substances of allergic respiratory diseases and there is a report that incorporation of BG into the living body together with endotoxin increases the action of endotoxin, its inflow into blood as a foreign material is not desirable, so that contamination of drugs, medical devices and the like with BG becomes a medically important subject.

Also, since the above-described BG is one of the Ls constituting components commonly present in fungal cell walls, detection of this substance indicates a possibility of being contaminated with other toxic components derived from fungi, so that examinations are also started on the application of BG measurement to the detection of fungi or test on the absence of fungi. Additionally, with the progress of studies on the production of medicines using microorganisms and cultured cells derived from various animals and on the various using cells in a macrophage system, it is important to examine not only microbial contamination at culturing but also acute check on the BG contamination and influence of their contamination upon the cells.

On the other hand, a limulus reagent prepared from a limulus amebocyte lysate (hereinafter sometimes referred to as "lysate") which has been generally used in an endotoxin test method, can recognize BG and react with BG, and a BG-specific limulus reagent has been developed using a BG-sensitive reactor (factor G) activation system derived from the lysate and is now insured as a diagnostic drug of deep mycosis. Additionally, it was found that a reagent containing a factor in prophenoloxidase cascasde prepared from a body fluid of an arthropod such as a silk worm or the like, can also recognize BG and react with BG (hereinafter, the limulus reagent and the reagent containing a factor in prophenoloxidase cascade are both referred to as "BG measuring reagent").

Because of a background that measurement of BG in the clinical field is carried out to inspect the presence or absence of contamination with fungi, it is expected that a standard substance for the measurement of BG is an appropriate substance derived from a fungus and there is a great demand for the development of a preparation process of an appropriate standard substance derived from a fungus. However, since the BG prepared from fungi, such as the genus Candida and the like, is contaminated with a large amount of mannan and its contamination with a pyrogenic substance typified by endotoxin is not avoidable, a BG preparation having sufficient purity as a standard substance of the above-described measurement and having a high reactivity with a measuring reagent, has not been obtained, so that curdlan (derived from a Gram-negative bacterium: a bacterium classified separately from fungi) and the like have been used as a standard substance for the measurement of BG.

An example of the currently used processes for the preparation of BG as a constituting component of a cell wall of a fungal cell comprises (1) a step in which the cell is subjected to a physical treatment with a A French press or the like, and then digested with a protease to collect the cell wall part by removing proteins and mannan, (2) a step in which the cell wall is subjected to a high temperature treatment in an autoclave or the like using a high concentration alkali or acid to extract a crude BG, and (3) a step in which the crude BG is subjected to neutralization and/or desalting by dialysis or the like, the BG is separated by adding an organic solvent, such as ethanol or the like, the thus separated material (precipitate) is collected by centrifugation or the like, and dehydrated with an organic solvent, such as acetone or the like, and then a precipitate is collected by centrifugation or the like, followed by pulverization by drying under a reduced pressure or the like (e.g., JP-A-3-119995, etc.).

As described above, a large number of reagents and measuring processes have been developed particularly for detecting BG with a high sensitivity, so that it is necessary to obtain BG which stably reacts as a standard substance with the limulus reagent and the reagent containing a factor in prophenoloxidase cascade, but such conventional BG preparation processes are considerably complex and accompany dangers, such as necessity of using a considerable number of steps, use of a high concentration alkali and acid under a high temperature, and the like. Additionally, since the BG obtained by the above-described processes has a low purity due to the presence of a large amount of contaminants, such as mannan and the like, and therefore is poor in stability, it shows a low reactivity when used as a standard substance in the measurement of BG and thus hinders the obtainment of stable measured values. Consequently, a process for preparing more stable BG having a higher purity from a fugal cell has been desired.

DISCLOSURE OF THE INVENTION

In order to solve the above-described problems, the present inventors have conducted extensive studies and found a process for easily and efficiently preparing BG having a high purity and a high reactivity with a BG measuring reagent from a fungal cell. Also, they found that, surprisingly, the BG prepared from a cell particularly belonging to the genus Candida by this process hardly contains mannan and endotoxin, while contamination of BG with such substances cannot easily be prevented conventionally. Thus, the present invention has been completed. That is, since a fungal cell, such as Candida or the like, is directly subjected to oxidation degradation under alkaline conditions, they succeeded in establishing an easy and efficient process for preparing safe BG having high purity without a complex operation of a purification after collection of a cell wall part from a fungal cell.

Furthermore, they found that BG in a sample can be measured more stably and more accurately using as a standard substance the BG having a high purity obtained from a fungal cell by the above-described process.

Moreover, they found a process for further stabilizing the above-described BG having a high purity obtained from a fungus, such as the above-described Candida or the like, and a stable and accurate measurement can be carried out using the thus stabilized BG by this process as a standard substance of the above-described BG measurement.

The present invention comprises the following constructions.

1. A process for preparing BG, comprising subjecting a fungal cell to oxidation degradation under alkaline conditions to release BG from a cell wall of the cell.
2. The process according to the above 1, wherein the oxidation degradation is carried out using a hypochlorite.
3. The process according to the above 1 or 2, which further comprises a step of dissolving a water-insoluble fraction obtained by the oxidation degradation in an aprotic polar solvent.
4. The process according to the above 3, wherein the aprotic polar solvent is dialkyl sulfoxide.
5. BG soluble in an aprotic polar solvent, which is obtainable by subjecting a cell of a microorganism belonging to the genus Candida to oxidation degradation under alkaline conditions to release BG from a cell wall of the cell.
6. The BG according to the above 5, wherein the oxidation degradation is carried out using a hypochlorite.
7. The BG according to the above 5 or 6, wherein the aprotic polar solvent is dialkyl sulfoxide.
8. The BG according to any one of the above 5 to 7, wherein mannan is contaminated at an amount of less than 5.0% (molar ratio).
9. The BG according to any one of the above 5 to 8, wherein endotoxin is contained at an amount of less than 0.1 pg/mg.
10. The BG according to any one of the above 5 to 9, wherein the glucan is a glucan capable of activating a factor G activation system of a limulus amebocyte lysate and/or a prophenoloxidase cascade system of a body fluid of an anthropod.
11. A BG composition comprising the BG of any one of the above 5 to 10, an excipient which does not activate a factor G activation system of a limulus amebocyte lysate or a prophenoloxidase cascade system of a body fluid of an anthropod, and/or a boron hydride alkali metal salt.
12. The BG composition according to the above 11, which is a freeze-dried product.
13. A process for measuring an amount of BG in a sample by a limulus reagent or a reagent containing a factor in a prophenoloxidase cascade, using the BG any one of the above 5 to 10 or the BG composition of the above 11 or 12 as a standard substance.
14. The process for measuring an amount of BG according to the above 13, wherein the limulus reagent is a BG-specific limulus reagent.
15. The process for measuring an amount of BG according to the above 14, wherein the reagent containing a factor in a prophenoloxidase cascade is prepared from a body fluid of an anthropod.
16. A kit for measuring BG, comprising at least the BG of any one of the above 5 to 10 or the BG composition of the above 11 or 12 as a standard substance.
17. The kit for measuring BG according to the above 16, which further comprises a limulus reagent or a reagent containing a factor in a prophenoloxidase cascade.

EMBODIMENT FOR CARRYING OUT THE INVENTION

The present invention is explained below by its embodiments.

(1) Preparation Process of the Present Invention

The preparation process of the present invention is a process for preparing BG, comprising subjecting a fungal cell to oxidation degradation under alkaline conditions to release BG from a cell wall of the cell.

According to the preparation process of the present invention, a fungal cell of which cell wall contains BG having a large number of (1→3)-β-D-glycoside bonds that can be recognized by the BG measuring reagent, preferably a microorganism belonging to the genus Candida, and more preferably Candida albicans, are used. The above-described cell separated from a culture broth or the like may be used directly as an intact cell, but it is also possible to use the cell after dewaxing and/or drying in the usual way.

It is preferred to suspend the fungal cell in an aqueous alkaline solution (aqueous sodium hydroxide solution, aqueous potassium hydroxide solution, aqueous magnesium hydroxide solution, aqueous calcium hydroxide solution or the like: from 0.01 to 0.3 mol/L) at from 0.1 to 100 mg/ml to inactivate endotoxin contained in the cell, and carry out oxidation degradation by adding an appropriate oxidizing agent (e.g., hypochlorite, periodate, or the like) to the aqueous solution. As the oxidizing agent, a hypochlorite (e.g., lithium hypochlorite, sodium hypochlorite, potassium hypochlorite, or the like) is particularly preferred, and sodium hypochlorite (hereinafter referred to as "NaClO") is most preferred, though not limited thereto.

For example, when NaClO is used as the oxidizing agent, it is preferred to suspend the cell in an aqueous alkaline solution, add an appropriate amount of NaClO to the suspension, and then carry out oxidation degradation reaction under stirring. Since NaClO is sometimes degraded in the aqueous solution, the concentration of NaClO to be added may vary depending on its preservation conditions but, if to be exemplified, it may be adjusted to give a concentration of from 0.3 to 10% at the reaction (effective chlorine content at the reaction) Although the degree of oxidation degradation varies depending on the temperature and treating time at the time of the reaction, it is most preferred to carry out the reaction at generally from 0 to 37° C., preferably from 2 to 8° C., for example, at 4° C., for 1 to 24 hours, preferably for 5 to 15 hours, though particularly not limited thereto.

As described above, as a result that the oxidation degradation reaction of the cell is carried out under alkaline conditions, endotoxin in the insoluble fraction containing BG can be inactivated, and mannan can be dissolved and removed from the insoluble fraction.

Since the BG released from a fungal cell, such as the genus Candida or the like, by the above-described oxidation degradation is insoluble in the reaction solution, it can be separated from the reaction solution-soluble fraction (containing substances which are soluble in a weakly alkaline solution, such as mannan or the like, and the oxidizing agent) by recovering the insoluble fraction from the solution. The recovery of the insoluble fraction can be carried out by a generally known solid/liquid separation means, such as filtration, centrifugation, or the like, but a centrifugation is particularly preferred.

Additionally, it is possible to desalt the reaction solution by dialysis or the like, and then recover the insoluble fraction by the above-described solid/liquid separation means.

In order to purify the objective BG at a high purity, the insoluble fraction is dissolved by an appropriate process, and polysaccharides can be separated and then recovered as a precipitate in the usual way. As the above-described dissolving process, for example, a process can be exemplified, in which the above-described insoluble fraction is dehydrated with an organic solvent, such as acetone or the like, and then is dissolved in an aprotic polar solvent. It is preferred that the aprotic polar solvent is a water-soluble organic solvent which can keep the reactivity of the objective BG with a limulus reagent and the like and also can dissolve the above-described BG, though not particularly limited. As the aprotic polar solvent, dialkyl sulfoxide, dialkylformamide and hexaalkylphosphoramide are preferred, and examples thereof include dimethyl sulfoxide, diethyl sulfoxide, dimethylformamide, hexamethylphosphoramide (HMPA), and the like. Among these, dimethyl sulfoxide (hereinafter referred to as "DMSO") is most preferred. The BG is dissolved by adding the aprotic polar solvent to the above-described insoluble fraction. In that case, the BG can be thoroughly extracted by pulverizing the extracted residue of the cells with an ultrasonic treatment or the like, and the BG can be simultaneously dissolved. By removing the insoluble material by a centrifugation or the like and adding a polar organic solvent, such as ethanol or the like, to the resulting supernatant fluid, the BG can be separated and recovered as the precipitate by centrifugation or the like. By dehydrating the precipitate with an organic solvent, such as acetone or the like, and drying it to a powder form, a stable BG powder having a low water content and a high purity can be obtained.

Reactivity, or titer, of the BG obtained by the above-described operation with the BG measuring reagent is assayed using, for example, a commercially available limulus reagent or a commercially available reagent containing a factor in prophenoloxidase cascade prepared from a body fluid of an anthropod. The compound having a desired titer is then used as a standard substance for the measurement of BG in a sample in the measurement of the present invention which will be described below.

(2) BG of the Present Invention

The BG of the present invention is BG capable of dissolving in an aprotic polar solvent, which is released from a cell wall of a fungal cell belonging to the genus Candida by subjecting the cell to oxidation degradation under alkaline conditions.

Regarding purity of the BG of the present invention, it is preferred that the amount of contaminated mannan is less than 5.0% (molar ratio) per amount of the BG. In the BG prepared from a Candida cell by the preparation process of the present invention, the amount of contaminated mannan is maintained at less than 5.0% (molar ratio).

The process of Torello L A et al., *J. Chromatography*, 202: 195–209 (1980) can be exemplified as the measuring process of the purity of the BG of the present invention. That is, 2 mg of the BG of the present invention is treated with 2 N trifluoroacetic acid at 121° C. for 90 minutes and acetylated with sodium borohydride, and then microanalysis of constituting sugars is carried out by DB-225-coated capillary type gas chromatography (Ohkura GC103C; analysis temperature: 220° C.)

Also, it is preferred that the amount of contaminated endotoxin in the BG of the present invention is less than 0.1 pg/mg. In the BG prepared from a Candida cell by the preparation process of the present invention, the endotoxin content is less than 0.1 pg/mg which is undetectable with a limulus reagent for endotoxin measurement.

The endotoxin content is measured by a limulus test in accordance with a usually used process; for example, the amount of contaminated endotoxin in the BG can be automatically determined by dissolving the BG powder of the present invention in a 0.3 mol/L aqueous NaOH solution to give a concentration of 1.0 mg/ml, optionally diluting the resulting solution with a 0.01 mol/L aqueous NaOH solution, to prepare a sample, dispensing each of 25 μL portions into predetermined wells of Toxipet Plate 96F (96 well endotoxin- and BG-free microplate; Seikagaku Corporation), adding 100 μL of an Endospec ES Test MK (endotoxin-specific limulus reagent: available from Seikagaku Corporation) solution to each well and then carrying out a kinetic assay at 37° C. for 30 minutes with Well Reader SK601 (Seikagaku Corporation).

Since the BG of the present invention obtained from a Candida cell by the process of the present invention has a high reactivity with the BG measuring reagent, stable measured values can be obtained when used as a standard substance at the BG measurement with the BG detection reagent which will be described below. In the BG measurement by a synthetic substrate process using the limulus reagent, it is preferred that the BG of the present invention shows an absorption changing rate of 0.2 ABs/min or more per 1 pg/ml, though not particularly limited.

The BG of the present invention can be produced by the preparation process of the present invention in which a Candida cell is subjected to oxidation degradation under alkaline conditions and then the thus released BG is extracted with an aprotic organic solvent. As described in the preparation process of the present invention, a generally known oxidizing agent can be used in the oxidation degradation with no particular limitation. However, sodium hypochlorite is particularly preferred. Also, as the aprotic polar solvent, alkyl sulfoxide, dialkylformamide and hexaalkylphosphoramide are preferred, and examples thereof include dimethyl sulfoxide, diethyl sulfoxide, dimethylformamide, hexamethylphosphoramide (HMPA) and the like. Among these, dimethyl sulfoxide is particularly preferred.

(3) BG Composition of the Present Invention

The BG composition of the present invention is a liquid or powder BG composition comprising the above-described BG of the present invention, an excipient which does not activate a factor G activation system of a limulus amebocyte lysate or a prophenoloxidase cascade system of a body fluid of an arthropod, and/or a boron hydride alkali metal salt.

The above-described excipient is not particularly limited, so long as it is a known excipient used in medicaments, drugs and the like. As such a substance, substances, such as dextran, sucrose, ficoll, mannitol, glycerol and the like, which are free of (1→3)-β-D-glycoside bond can be used. Among these substances, dextran which has an effect to improve stability of the BG of the present invention is particularly preferred. For example, when dextran is added to the BG of the present invention, it is added to give a concentration of from 0.1 to 2% (w/v), preferably from 0.3 to 0.7% (w/v).

Also, examples of the boron hydride alkali metal salt include lithium borohydride, sodium borohydride, potassium borohydride and the like. Among these, sodium borohydride is preferred, though not particularly limited. In the case of sodium borohydride, the BG of the present invention can be stabilized when it is added at an amount of from 1 mM to 100 mM, preferably from 5 mM to 20 mM, based on the composition. Although the BG composition solution of the present invention can be preserved as it is and used as a standard substance for the BG measurement, it is preferred to make it into powder by a drying means, such as freeze-drying or the like, due to that its stability during preservation is further improved.

(4) Measurement Process of the Present Invention

The measurement process of the present invention is a process for measuring an amount of BG in a sample with a limulus reagent or a reagent containing a prophenoloxidase cascade using the above-described BG of the present invention or the above-described BG composition of the present invention as a standard substance.

Regarding the limulus reagent for use in the measurement process of the present invention, any reagent can be used, so long as it contains the factor G activation system reaction factor obtained using a lysate as a material extracted from amoebocyte (hemocyte) of a limulina. Examples of the limulus reagent include usual lysates prepared by a known process (e.g., *J. Biochem.*, 80: 1011–1021 (1976)) from blood lymphocytes of a limulina, such as *Limulus polyphemus, Tachypleus tridentatus, Tachypleus gigas, Tachypleus* (*Carcinoscorpius*) *rotundicauda*, or the like, BG-specific lysates in which an endotoxin-sensitive factor (factor C) is removed or inactivated, and synthetic substrate process limulus reagents, such as a BG-specific reagent and the like, prepared by adding a synthetic substrate to such a lysate (JP-A-4-285859, etc.).

Additionally, the limulus reagent for use in the measurement process of the present invention may also be a gelation process limulus reagent containing, as a main component, a usual lysate or a BG-specific lysate in which the factor C is removed or inactivated, or a turbidmetric limulus reagent to which the gelation reaction is applied.

The reagent containing a factor in prophenoloxidase cascade for use in the measurement process of the present invention is not particularly limited so long as it is a reagent containing a factor in BG system reaction obtained using a body fluid of an anthropod or the like as a starting material, but a commercially available reagent which is prepared from the body fluid of a silk worm and can react with peptidoglycan and BG (e.g., SLP reagent (manufactured by Wako Pure Chemical Industries, Ltd.)) can also be used. Detection of the reaction by the above-described reagent may be carried out by a known process, such as a process in which the enzyme activity of expressed enzyme, such as benzoylarginine ethyl ester hydrolase (BAEEase), prophenol oxidase activating enzyme (PPAE), phenol oxidase (PO), or the like, is measured or the expression time of these enzyme activities is measured. For example, a process in which the activation degree of PO is measured (e.g., a process for measuring a quinoline pigment formed or a process for measuring a melanin pigment formed by oxidation of L-β-(3,4-dihydroxyphenyl)alanine (DOPA)) as described in JP-A-1-142466 and JP-B-7-114707, a process in which the BAEEase activity is measured, and a process in which the PPAE activity is measured as described in JP-A-7-184690 can be used.

Also, the above-described limulus reagent or reagent containing a factor in prophenoloxidase cascade may be in any form of liquid, powder, solid or the like.

The BG in body fluids, such as serum, plasma, tissue liquid, and the like, water, reagents, medicaments and samples taken out during medicament production steps, and the like can be measured using the process of the present invention.

(5) Kit of the Present Invention

The kit of the present invention is a kit for measuring BG, comprising at least the BG of the present invention or the BG composition of the present invention as a standard substance.

The kit of the present invention is a kit for carrying out the above-described measurement process of the present invention, which comprises the above-described BG of the present invention or the BG composition of the present invention prepared by stabilizing the same as a standard substance. It is preferred that the kit of the present invention further contains a limulus reagent or a reagent containing a factor in prophenoloxidase cascade, which is a measurement reagent for use in carrying out the above-described measurement process of the present invention. Additionally, distilled water which is not contaminated with BG (BG-free), a 96 well microplate to which BG is not adhered (BG-free) and the like may also be included in the kit.

BEST MODE FOR CARRYING OUT THE INVENTION

The present invention is further illustratively explained with reference to examples, but the present invention is not limited to these examples.

EXAMPLE 1

Culturing of Cells

*Candida albicans* IFO 1385 was liquid-cultured (using a jar fermentor; stirring speed: 400 rpm) at 27° C. for 48 to 72 hours in 5 L of a C-limiting medium (containing sucrose as the carbon source), and the cells were subjected to an acetone treatment and dewaxing to obtain 17.9 g of dry cells.

EXAMPLE 2
Preparation of BG

To 1 g of the dewaxed dry cells, 200 mL of a 0.1 mol/L aqueous NaOH solution was added, followed by suspending, and the suspension was mixed with 25, 50, 100 or 200 mL of NaClO (sodium hypochlorite, Antiformin; available chlorine: min 5.0%, manufactured by Wako Pure Chemical Industries), followed by stirring overnight at 4° C. to carry out oxidation degradation. The mixture was centrifuged at 3,000 rpm for 10 minutes, the resulting precipitate was mixed with 200 mL of BG-free distilled water, followed by stirring, the resulting mixture was centrifuged (3,000 rpm, 10 minutes), and 200 mL of acetone was added thereto to obtain a dehydrated precipitate. To the precipitate, 30 mL of DMSO was added, and the precipitate was dissolved by an ultrasonic treatment over 1 hour. The resulting mixture was centrifuged at 3,000 rpm for 10 minutes to obtain a supernatant, two volumes of ethanol was added to the supernatant under stirring to separate BG, and the thus separated BG was centrifuged at 3,000 rpm for 10 minutes to obtain a precipitate. The precipitate was mixed with 100 mL of acetone and centrifuged at 3,000 rpm for 10 minutes to obtain a dehydrated precipitate, followed by drying under a reduced pressure to obtain powder of BG.

Also, purified powder of BG (lentinan) was obtained from *Lentinus edodes* in the same manner.

EXAMPLE 3
Measurement of Titer

Figure 1:
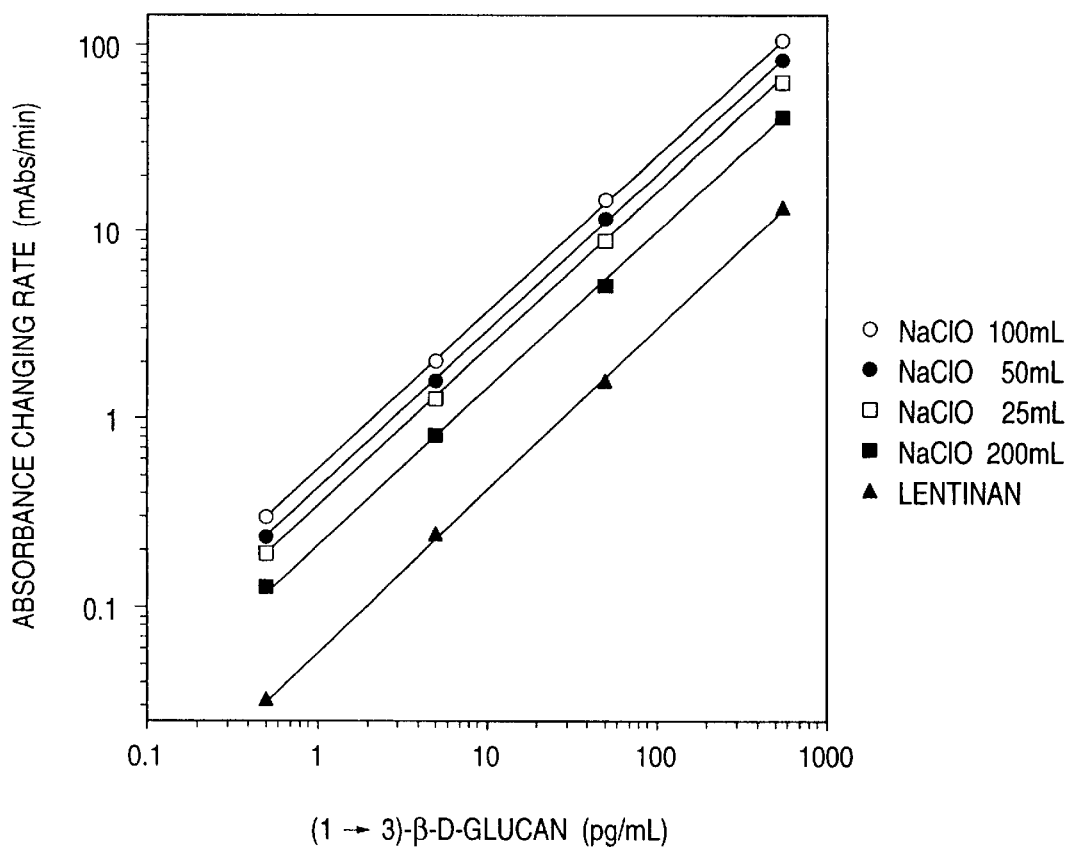
FIG. 1 is a graph showing each titer of the BG of the present invention at varied oxidation degrees.

Each of the powder samples of the BG of the present invention obtained in Example 2 using respective amounts of NaClO was dissolved in a 0.3 mol/L aqueous NaOH solution to give a concentration of 1.0 mg/mL, and the solution was optionally diluted with a 0.01 mol/L aqueous NaOH solution to prepare dilutions as samples. Into predetermined wells of Toxipet Plate 96F (endotoxin- and BG-free 96 well microplate: Seikagaku Corporation), 25 μl of the samples or a blank solution (BG-free distilled water) was dispensed, 100 μL of a Fungitec G Test MK (BG-specific limulus reagent: Seikagaku Corporation) solution was added to each well, and then the plate was covered and set on Well Reader SK601 (a set of a thermostat and a microplate reader having a built in analytic program: Seikagaku Corporation) and a kinetic assay was carried out at 37° C. for 30 minutes to measure the titer of each sample. The results are shown in FIG. 1. It was confirmed that the BG of the present invention has a higher titer than lentinan which is a BG prepared from *Lentinus edodes* by the conventional process.

EXAMPLE 4
Measurement of Endotoxin Content

Each of the powder samples of the BG of the present invention obtained in Example 2 was dissolved in a 0.3 mol/L aqueous NaOH solution to give a concentration of 1.0 mg/mL, and the solution was optionally diluted with a 0.01 mol/L aqueous NaOH solution and used as samples. In the same manner as described in Example 3, 25 μl of each of the samples was dispensed into predetermined wells of Toxipet Plate 96F (endotoxin- and BG-free 96 well microplate: Seikagaku Corporation), 100 μL of an Endospec ES Test MK (endotoxin-specific limulus reagent: Seikagaku Corporation) solution was added to each well, and then a kinetic assay was carried out at 37° C. for 30 minutes using Well Reader SK601 to measure the endotoxin content of each sample. As a result (Table 1), no contaminated endotoxin was found in all of the samples.

TABLE 1

| | Endotoxin content (*E. coli* 0111: B4 equivalent, pg/mg) |
| --- | --- |
| Lentinan | 0.1 |
| NaClO 200 ml | 0.0 |
| NaClO 100 ml | 0.0 |
| NaClO 50 ml | 0.1 |
| NaClO 25 ml | 0.1 |

Figure 2:
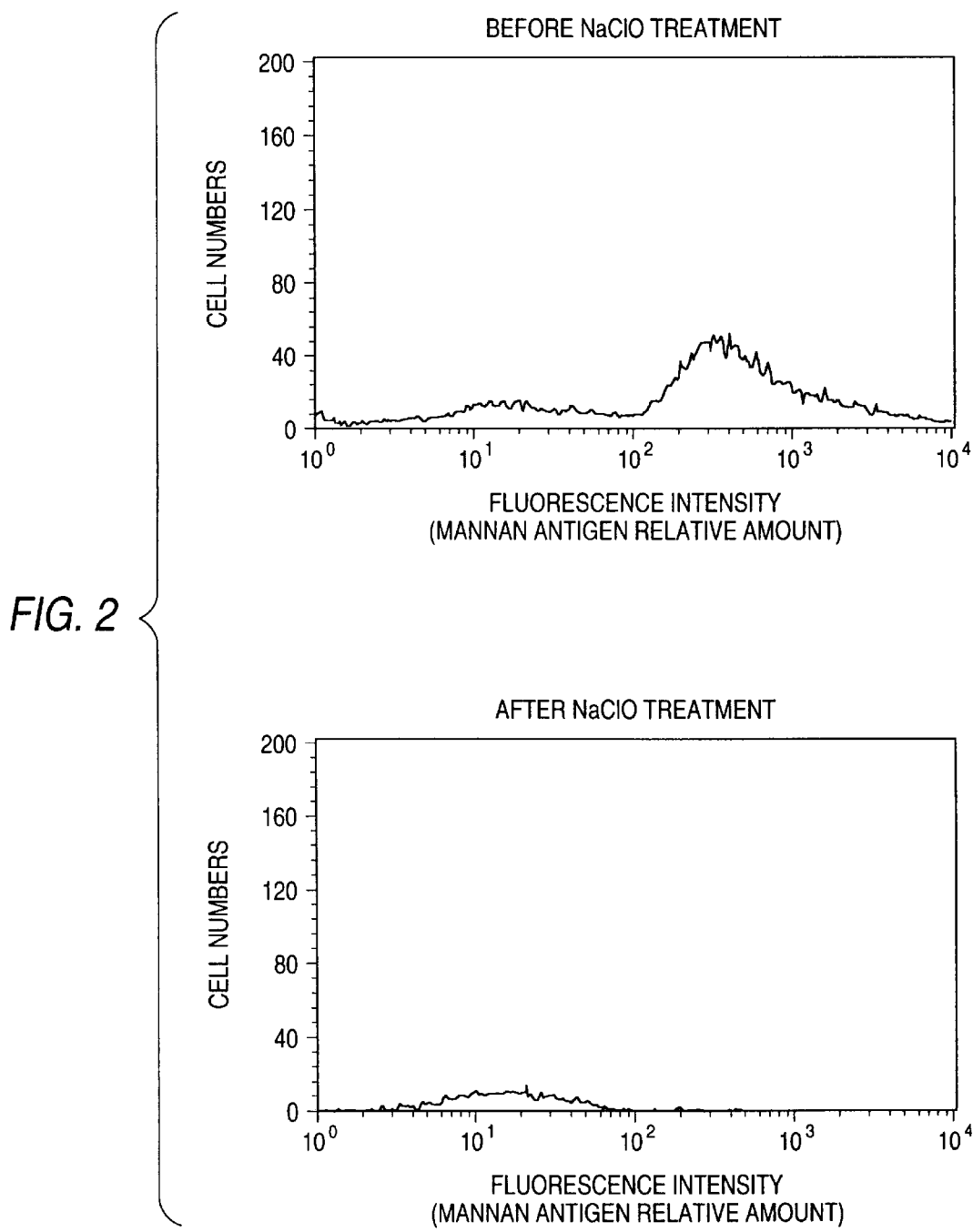
FIG. 2 is a graph showing results of the quantitative analysis of an mannan antigen in each of controlled cells (acetone-treated cells) and cells treated according to the present invention in Example 5 by flow cytometry.

EXAMPLE 5
Purity Measurement (1) Quantitative Analysis of Contaminated Mannan by Flow Cytometry An anti-mannan antibody (anti-Candida type 1 serum (RM302-1); a Candida identification factor antibody kit (Candida Check, RM302-K25) was used; Iatron Laboratories, Inc., Tokyo, Lot. S678) and an FITC-labeled anti-rabbit IgG (H+L) antibody (Anti Rabbit IgG (H+L) (Goat), F(AB'), FITC conjugated (011-12621), Wako) were added to a PBS suspension of the acetone-treated dry Candida cells (control) described in Example 1 or the cells treated with 25 ml of NaClO by the present invention (treated), and the mannan antigen was quantitatively analyzed by a flow cytometry (FACS Caribur TM and an analysis software Cell Quest TM (Becton-Dickinson, Calif.)) (FIG. 2). Based on the results, significant decrease in the fluorescence intensity was found in the treated cells compared to the control, so that disappearance of the mannan antigen was clearly confirmed.

(2) Analysis of Sugar Composition

In accordance with a generally used process (Torello L A et al., *J. Chromatography*, 202: 195–209 (1980)), 2 mg of the BG of the present invention produced from the Candida cells using the process described in Example 2 was treated with 2 N trifluoroacetic acid at 121° C. for 90 minutes and treated with sodium borohydride for acetylation, and then microanalysis of the constituting sugars was carried out (analysis temperature, 220° C.) by DB-225-coated capillary type gas chromatography (Ohkura GC103C) (Table 2). As a result, the ratio of BG to mannan was found to be 1:0.05 or less, so that it was confirmed that the amount of contaminated mannan in the BG of the present invention was extremely slight.

TABLE 2

| Strain | Molecular ratio (BG/mannan) |
| --- | --- |
| C. a 1385 | 1/0.0426 |
| C. a 1594 | 1/0.0449 |
| C. a 0583 | 1/0.0088 |
| C. p 0640 | 1/0.0286 |
| C. p 0708 | 1/0.0184 |
| C. p 1068 | 1/0.0184 |

C. a. *C. albicans*; C. p: *C. parapsilosis*

4→3 Structure Analysis of Polysaccharide by $^{13}$C-NMR and $^{1}$H-NMR

The BG of the present invention described in Example 2 (25 ml of NaClO was used) was dissolved in DMSO-d6 (Merk, F. R. Germany) and subjected to high resolution $^{13}$C- and $^{1}$H-NMR (DRX 500 and an analyzing software XWIN-NMR, Bruker, Germany) (analyzing temperature: 70° C.).

It was confirmed based on respective chemical shifts (Table 3) that the BG contains straight chain β-1,3- and straight chain β-1,6-bonds, and it was assumed from the $^{13}$C chemical shift that it contains almost no branched type 1,3-bond. Also, the ratio of 1,6-bond to 1,3-bond was analyzed to be 1:0.438 in the case of the BG of the present invention obtained in Example 2, though it varies depending on the species and treating conditions.

TABLE 3

| | $^{13}$C-NMR Chemical shift | | | | | | |
|---|---|---|---|---|---|---|---|
| | C-1 | C-2 | C-3 | C-4 | C-5 | C-6 | Ratio |
| 1→3 | 102.8 | 72.6 | 86.1 | 68.3 | 76.2 | 60.8 | 1 |
| 1→6 | 103.1 | 73.3 | 76.4 | 69.9 | 75.3 | 68.3 | 0.438 |

Figure 3:
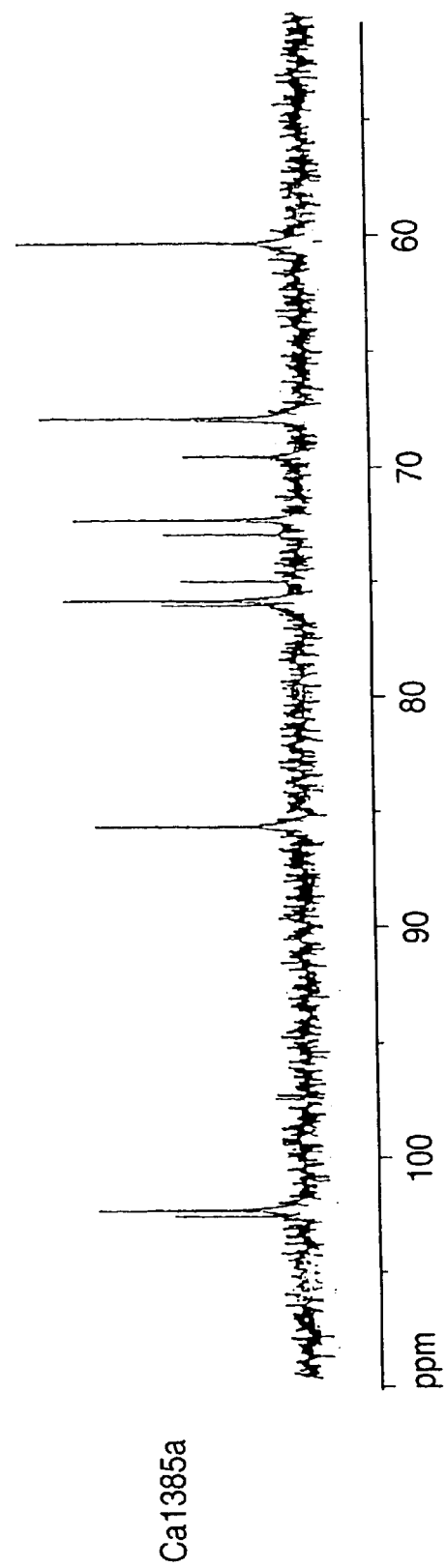
FIG. 3 shows a $^{13}$C-NMR spectrum of the BG of the present invention.

(see FIG. 3)

EXAMPLE 6
Measurement of Physiological Activities
(1) Measurement of Antitumor Activity A mouse solid carcinoma cell strain S-180 of 5×10$^6$ cells was subcutaneously administered to each mouse, 100 Lag of the BG derived from Candida prepared in Example 2 (BG of the present invention), commercially available lentinan derived from *Lentinus edodes* or a physiological saline as a control was intraperitoneally administered on the 7th, 9th and 11th days, and the tumor tissue was extracted from each mouse on the 35th day to measure its weight (Table 4).

TABLE 4

| Treatment | Animal numbers | Complete involution | Average tumor weight (g) |
|---|---|---|---|
| Physiological saline | 11 | 0 | 5.29 ± 1.72 |
| Lentinan | 10 | 2 | 0.93 ± 1.89 |
| BG of the present invention | 10 | 5 | 1.05 ± 2.90 |

(2) Productivity of Interleukin (IL)-8 in Human Peripheral Blood

Neutrophils collected from peripheral blood of a healthy person were cultured by adding the BG derived from Candida prepared in Example 2 (BG of the present invention), commercially available lentinan derived from *Lentinus edodes* or a physiological saline as a control, and 24 hours thereafter, the amount of IL-8 in the culture supernatant was measured by ELISA (Table 5).

TABLE 5

| Treatment | IL-8 Productivity (pg/ml) |
|---|---|
| Physiological saline | 2085 ± 12 |
| Lentinan | 3930 ± 361 |
| BG of the present invention | 5860 ± 295 |

EXAMPLE 7
Stability Test of BG

Using a sample (sample 1) prepared by adding 0.4% (w/v) of dextran (molecular weight 40,000) to a 0.01 M aqueous NaOH solution containing 500 pg/mL of the BG of the present invention obtained in Example 2, a sample (sample 2) prepared by adding 10 mm of sodium borohydride to the above-described solution of the BG of the present invention and a sample (sample 3) prepared by adding 10 mM of sodium borohydride to the sample 1, their stability was measured by the process of Example 2 (Table 6). The aqueous NaOH solution containing the BG of the present invention was used as a control. Improvement of the stability was found in all of the samples 1 to 3, but the stability of the BG of the present invention was further increased by using sodium borohydride and dextran in combination in comparison with the case that each was used alone.

TABLE 6

| | Days | | | |
|---|---|---|---|---|
| Samples | 0 | 3 | 7 | 14 |
| Control | 100 | 66 | 41 | 13 |
| Sample 1 | 100 | 100 | 98 | 85 |
| Sample 2 | 100 | 100 | 99 | 95 |
| Sample 3 | 100 | 100 | 100 | 99 |

In the table, data were shown by a relative activity (%) when the activity in the first day (day 0) was defined as 100%.

EXAMPLE 8
Kit for BG Measurement
(1) Stabilized BG (powder obtained by dissolving 4 mg of dextran and 4 mg of sodium borohydride in 1 mL of a 0.01 M aqueous NaOH solution containing 500 pg/mL of the BG of the present invention prepared in Example 2, followed by freeze-drying)
(2) BG-specific limulus reagent
(3) 96 Well microplate (BG-free): one plate
(4) Distilled water (BG-free): 10 mL
Measurement Using powder of lentinan obtained from *Lentinus edodes* by the process of Example 2, the measurement of the process of Example 2 was carried out by the kit of the present invention. As a result, stable measured values were obtained with no dispersion.

Industrial Applicability

According to the present invention, a large amount of BG having various biological activities can be solubilized and purified from a fungal cell, such as the genus Candida or the like, and BG having a high purity can be easily obtained. Also, the present invention provides a process in which BG is isolated from cells of the genus Candida using the above-described preparation process and activity of the BG is maintained stably, and an accurate BG measurement process having a high reproducibility using the above-described BG or stabilized BG as a standard substance.

What is claimed is:

1. A process for preparing (1→3)-β-D-glucan, comprising subjecting a fungal cell to oxidation degradation under alkaline conditions and dissolving a water-insoluble fraction obtained by the oxidation degradation in an aprotic polar solvent.

2. The process according to claim 1, wherein the oxidation degradation is carried out using a hypochlorite.

3. The process according to claim 1, wherein the aprotic polar solvent is dialkyl sulfoxide.

4. (1→3)-β-D-Glucan soluble in an aprotic polar solvent, which is obtainable by subjecting a cell of a microorganism belonging to the genus Candida to oxidation degradation under alkaline conditions to release (1→3)-β-D-glucan from a cell wall of the cell.

5. The (1→3)-β-D-glucan according to claim 4, wherein the oxidation degradation is carried out using a hypochlorite.

6. The (1→3)-β-D-glucan according to claim 4, wherein the aprotic polar solvent is dialkyl sulfoxide.

7. The (1→3)-β-D-glucan according to claim 4, wherein the degree of contamination of the (1→3)-β-D-glucan by mannan is less than 5.0% (molar ratio).

8. The (1→3)-β-D-glucan according to claim 4, wherein endotoxin is contained at an amount of less than 0.1 pg/mg.

9. The (1→3)-β-D-glucan according to claim 4, wherein the glucan is a glucan capable of activating a factor G activation system of a limulus amebocyte lysate and/or a prophenoloxidase cascade system of a body fluid of an arthropod.

10. A (1→3)-β-D-glucan composition comprising the (1→3)-β-D-glucan of claim 5, an excipient which does not activate a factor G activation system of a limulus amebocyte lysate or a prophenoloxidase cascade system of a body fluid of arthropod, and/or a boron hydride alkali metal salt.

11. The (1→3)-β-D-glucan composition according to claim 11, which is a freeze-dried product.

* * * * *